United States Patent
Lara (10) Patent No.: US 6,234,509 B1
(45) Date of Patent: May 22, 2001

(54) SPRING RETURN COUPLER

(75) Inventor: Hector Lara, El Paso, TX (US)

(73) Assignee: Hammerblow Corporation, El Paso, TX (US)

( * ) Notice: Subject to any disclaimer, the term of this patent is extended or adjusted under 35 U.S.C. 154(b) by 0 days.

(21) Appl. No.: 09/021,423

(22) Filed: Feb. 10, 1998

(51) Int. Cl.[7] .............................. B60D 1/06; B62D 53/06
(52) U.S. Cl. .................................. 280/425.2; 280/441.2; 280/496; 280/475; 280/513; 403/109.3
(58) Field of Search .............................. 280/425.1, 425.2, 280/441.2, 477, 496, 475, 486, 482, 491.2, 504, 511, 512, 513, 483; 403/109.6, 109.5, 109.3, 316, 330, 322.2

(56) References Cited

U.S. PATENT DOCUMENTS

| | | | |
|---|---|---|---|
| 2,438,032 | 3/1948 | Bready | 280/33.15 |
| 2,706,644 | 4/1955 | Black | 280/446 |
| 2,882,070 * | 4/1959 | Bill | 280/475 |
| 3,158,387 | 11/1964 | Martin | 280/478 |
| 3,703,301 | 11/1972 | Randle | 280/438 |
| 3,790,188 | 2/1974 | Johannes | 280/423 |
| 3,796,444 | 3/1974 | Hixon | 280/483 |
| 3,945,668 | 3/1976 | Holland | 280/423 R |
| 4,043,687 * | 8/1977 | Van Dyke, Jr. et al. | 403/322 |
| 4,082,168 | 4/1978 | Cole et al. | 188/112 R |
| 4,113,221 | 9/1978 | Wehner | 248/408 |
| 4,165,854 | 8/1979 | Duly | 248/408 |
| 4,320,907 | 3/1982 | Eaton | 280/511 |
| 4,662,647 | 5/1987 | Calvert | 280/490 R |
| 4,669,748 | 6/1987 | LeVee | 280/423 R |
| 4,699,395 | 10/1987 | Hale | 280/511 |
| 4,704,062 * | 11/1987 | Hale | 280/441.2 |
| 4,796,864 * | 1/1989 | Wilson | 254/425 |
| 5,160,157 | 11/1992 | Hubler | 280/423.1 |
| 5,240,270 | 8/1993 | Colibert | 280/417.1 |
| 5,324,061 | 6/1994 | Lay | 280/417.1 |
| 5,382,109 * | 1/1995 | Nyman | 403/316 |
| 5,385,363 | 1/1995 | Morey | 280/511 |
| 5,409,251 * | 4/1995 | Thorndyke | 280/475 |
| 5,482,309 * | 1/1996 | Hollis | 280/423.1 |

OTHER PUBLICATIONS

The HammerBlow Corporation, 12,000 LB. and 7,000 LB. Capacity Square Jacks, Pamphlet Form. No. SJ079–10MCCD, Wausau, Wisconsin.

* cited by examiner

Primary Examiner—Brian L. Johnson
Assistant Examiner—Avraham H. Lerner
(74) Attorney, Agent, or Firm—Whyte Hirschboeck Dudek SC (57) ABSTRACT

A device and method for coupling a trailer which has a trailer tongue mount attached to the trailer and a coupler attached to the trailer tongue mount. The coupler has an outer tube assembly, an inner tube assembly slidably received by the outer tube assembly, and a return spring having a first end attached to the outer tube assembly, and a second end attached to the inner tube assembly for drawing the inner tube assembly upwardly toward the first end of the return spring. The inner tube assembly may include an inner tubular member which has a plurality of height adjusting holes, a top end and a bottom end. The inner tube assembly may also include a female coupling member attached to the bottom end of the tubular member. A locking handle assembly may be attached to the inner tube assembly to prevent the coupler from disengaging from the towing vehicle. The outer tube assembly may include an outer tubular member, a reinforcing band attached to the outer tubular member, an adjusting nut attached to the reinforcing band, and an adjusting bolt in communication with the nut to provide a friction force on the inner tube assembly. A plunger pin may engage one of the adjusting holes in the inner tube assembly. A snapper pin may be used to indicate that the plunger pin is properly closed.

22 Claims, 5 Drawing Sheets

SPRING RETURN COUPLER

BACKGROUND OF THE INVENTION

1. Field of the Invention

This invention relates generally to devices which attach structures together but primarily to vehicle trailer hitch assemblies. It is believed that the invention has very practical application in coupling and uncoupling trailers to hauling tractors or other towing vehicles.

2. Description of the Prior Art

Those familiar with the use of trailer hitches are aware of the difficulties encountered when coupling and uncoupling a hitch ball to a female member of a male-female style trailer hitch. Heretofore, coupling and uncoupling these components of the hitch together required precise alignment prior to engagement and disengagement. With more massive payloads and towing vehicles, this task has become particularly difficult, because maneuverability of the towing structures has diminished. For example, this is true for a popular style towing hitch which uses a long, vertical tubular member attached to the receiver or female coupling member of the coupler known as "gooseneck" or "neckover" couplers.

A coupler which assists in engaging and disengaging these hitches would be of great utility. Currently it is a laborious process to hook and unhook the "gooseneck" trailer with heavy tongue loads. For instance, when using a conventional jack it takes about 24 turns of a crank to raise the trailer enough for the coupler to clear the ball. Moreover, when a trailer has a maximum 3,000 pound tongue load, it requires more torque to turn the crank than the average person can generate. To address this problem, trailer manufacturers have generally taken three different approaches.

In the first approach, manufacturers are using jacks with two speed gear boxes. This solves the torque problem, but significantly increases the number of turns required and the number of moving parts in the unit.

In another approach, a few horse and livestock trailer manufacturers are providing electric and electric over hydraulic devices to crank the jack up and down. This is a very high cost alternative which can increase the price of a trailer by as much as 10 percent. This solution also increases the number of moving parts.

These additional moving parts require continuous lubrication to operate efficiently. Moreover, in the corrosive environment in which these couplers often operate, the annoyance and hazard of malfunction is exacerbated. Therefore, a coupler with fewer moving parts would greatly simplify maintenance and reduce the likelihood of malfunction.

Finally, some utility trailer manufacturers have adopted a jack-style coupler. This coupler requires minimum cranking on the jack, however, the operator must crank the jack-style coupler to raise the trailer off the hitch ball instead. Although this process requires fewer turns and far less torque, it is still quite laborious.

What is needed is an inexpensive and uncomplicated coupling device that is easier to use and takes less time and effort to couple and uncouple.

SUMMARY OF THE INVENTION

The primary object of this invention is to provide an inexpensive and reliable male-female style vehicle trailer coupling device and hitch assembly that is quickly and easily raised and lowered.

Another object is to have a device that has few moving parts so that maintenance and the likelihood of malfunction is at a minimum.

Yet another object of the present invention is to provide an improvement over existing male-female style trailer hitches because of its extremely simple design and operation, minimal construction costs, and minimal machining to manufacture.

Another object of the present invention is to provide a coupler with a spring return and with a locking element which facilitates entry of the male coupling member into the female coupling member cavity through an angled surface which tapers inwardly from the perimeter of a locking plate.

It is another important object of the present invention to provide a safer and more effective trailer coupling device.

Various other features, objects and advantages of the present invention will be made apparent from the following detailed description and the drawings.

BRIEF DESCRIPTION OF THE DRAWINGS

The drawings illustrate the best mode presently contemplated for carrying out the invention.

In the drawings.

DESCRIPTION OF THE PREFERRED EMBODIMENTS

The preferred embodiments of the present invention are illustrated by way of example in FIGS. 1–7, wherein like numbers refer to similar parts throughout.

Figure 1:
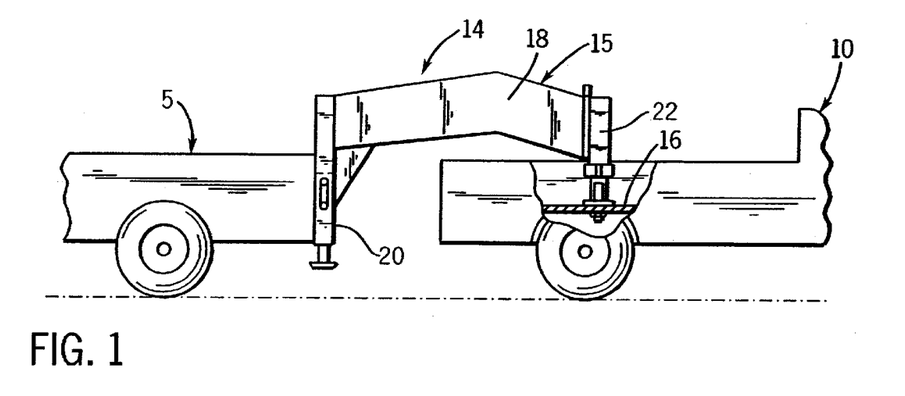
FIG. 1 is a side elevational view of a trailer having the invention affixed thereto and attached to a towing vehicle with portions broken away.

Referring specifically to FIG. 1, the present invention relates to a trailer 5 connected to a towing vehicle 10. The trailer 5 has a coupling device 14 including a trailer tongue mount 18 extending from the trailer forwardly toward the towing vehicle 10. Preferably, the trailer tongue mount 18 is a gooseneck 15 which extends over a truck bed 16 of the towing vehicle 10. A jack 20 is attached to the trailer 5 to support the weight of the trailer when the trailer 5 is disconnected from the towing vehicle 10.

The coupling device 14 consists of the trailer tongue mount 18 attached to the trailer 5 and a coupler 22 attached to the trailer tongue mount 18 which extends downwardly toward the truck bed 16. As shown generally in FIG. 2, the coupler 22 engages a male coupling member or hitch ball 24 which is attached to the truck bed 16 over the rear axle of the towing vehicle 10.

Figure 2:
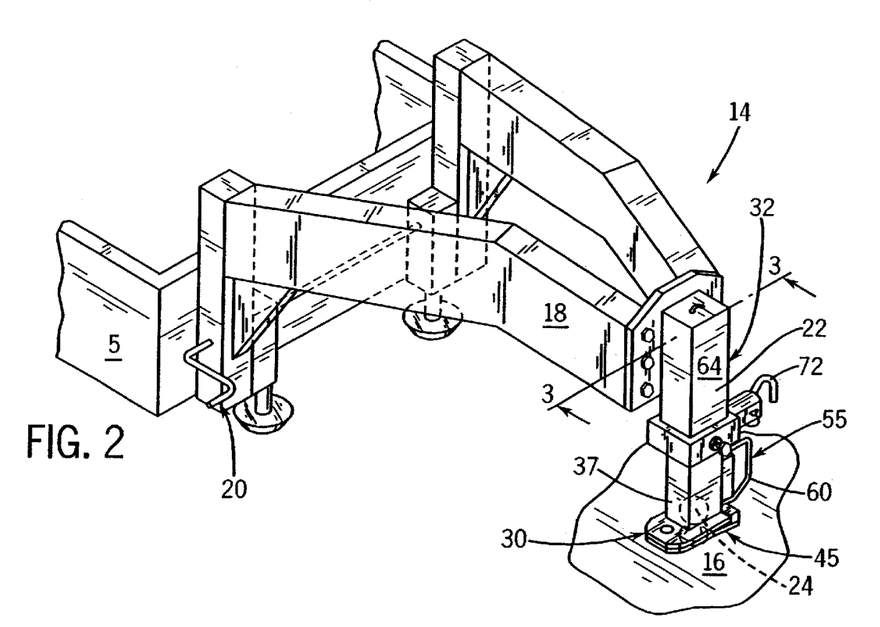
FIG. 2 is a perspective view of one embodiment of the improved coupling device.

As shown in FIG. 2, the coupler 22 includes an inner tube assembly 30 and an outer tube assembly 32. The inner tube assembly 30 is slidably received by the outer tube assembly 32. In the first embodiment shown in FIG. 2, the tube assemblies are made of a square, steel, tubular stock. In the second embodiment shown in FIG. 6, the tube assemblies are of a circular, steel, tubular stock. However, any geometric shape or strong metal alloy will do. Preferably, the diameter of the inner tube assembly 30 is smaller than the diameter of the outer tube assembly 32 so that the inner tube assembly fits telescopingly inside of the outer tube assembly, but can move freely in and out.

Figures 4, 5:
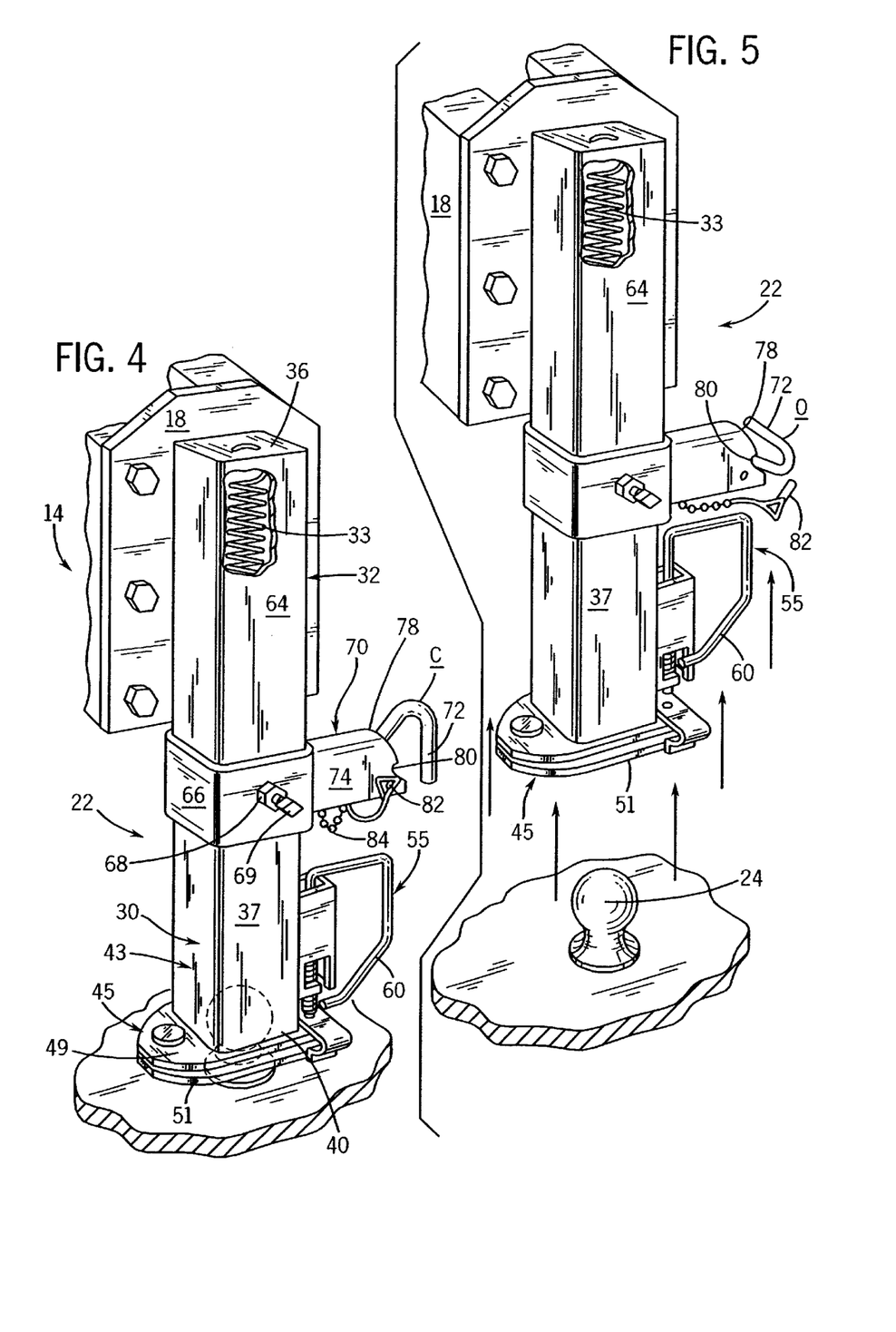
FIG. 4 is a perspective view of the improved coupling device of FIG. 2 in the closed position.
FIG. 5 is a perspective view of the improved coupling device of FIG. 2 in the open position.

As shown in FIG. 4, a return spring 33 connects the inner tube assembly 30 to the outer tube assembly 32. The spring 33 is designed to lift the inner tube assembly 30 up off the ball 24 when an operator desires to uncouple the trailer 5.

Figure 3:
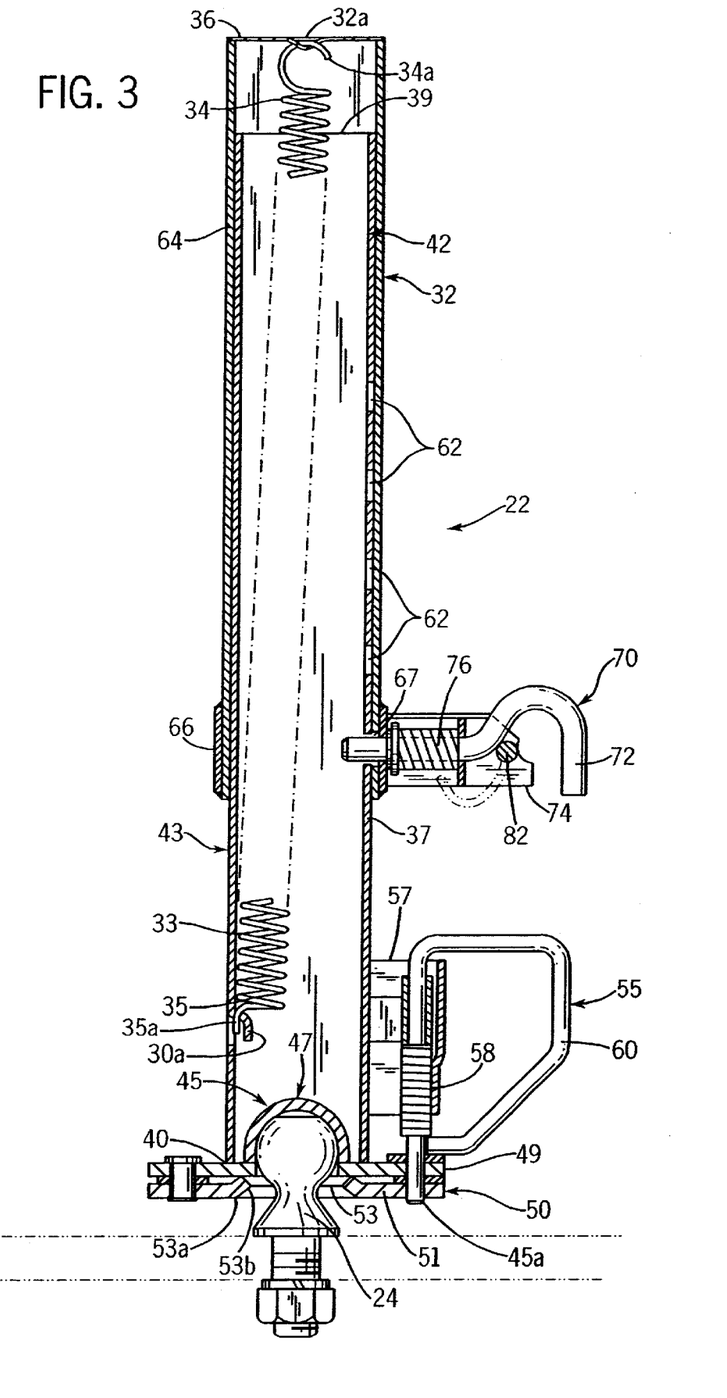
FIG. 3 is a fragmentary view of the improved coupling device of FIG. 2.

As best shown in FIG. 3, the return spring 33 has a first end 34 and a second end 35. The first end 34 is attached to a flanged portion 32a of the outer tube assembly 32. In the first embodiment, the flanged portion 32a is located at the top of the outer tube assembly 32. The flanged portion 32a consists of a piece of steel punched from a top plate 36 which is welded to the top of the outer tube assembly 32. Alternatively, the flanged portion may be punched from the outer tubular member wall. The flanged portion 32a is sufficiently long and wide to receive a curved, hooked end 34a of the return spring 33. Similarly, in the first embodiment, the inner tube assembly 30 also has a punched-out flanged portion 30a bent inwardly to form a hanger on which may attach a curved hooked end 35a of the return spring 33 as best shown in FIG. 3.

The flanged portions 30a and 32a may be punched out of the inner tubular member 37, the outer tubular member 64 or top plate 36 by use of a staking process that drives a stake through the tubular member wall or plate 36 in one punch. The stake pops a flanged portion out of the tubular members 37 and 64 or plate 36 which is preferably about ⅜ of an inch long. The stake also makes the flanged portions 30a and 32a hook-like to better receive the ends 34a, 35a of the spring 33 so that expensive welding is unnecessary.

The return spring 33 is an extension spring, preferably made of ten gauge (0.135 inch) round music wire. The return spring 33 has approximately 63 coils and when fully extended measures about 39 inches in length. It has roughly 66 pounds of force. Fully retracted, the return spring 33 measures about 28 inches in length and has about 38 pounds of force. The inner diameter of the spring is about 1.4 inches while the outer diameter measures about 1.7 inches. The free length of the spring is about 12 inches. A spring of this type is available from Oshkosh Coil Spring, Inc. of Oshkosh, Wis.

In the first embodiment as best shown in FIG. 4, the inner tube assembly 30 consists of a square inner tubular member 37 made from square, steel, tubular stock. Preferably, the outside diameter of the inner tubular member 37 is about 4.0 inches. The square inner tubular member 37 has a top end 39 and a bottom end 40 as shown in FIG. 3. The inner tube assembly 30 also includes an upper portion 42 and a lower portion 43.

A female coupling member 45, preferably constructed of steel, is attached to the inner tube assembly lower portion 43, preferably at the inner tubular member bottom end 40. The coupling member 45 is preferably welded to the bottom end 40. As best shown in FIG. 3, the female coupling member 45 has a concave cavity 47 which is defined by a stationary inner element 49 formed from a plate having an aperture therein for receiving a male coupling member or ball 24 as further described in U.S. Pat. No. 5,382,109 incorporated by reference herein. Attached to the stationary inner element 49 is a pivotally supported plate-like element 50 which also has an aperture 53 therein. The plate-like outer element 50 is preferably a locking plate 51 which may be locked into place with a lock handle assembly 55.

In order to enter the female coupling member 45, the ball 24 must pass through a distended or wider diameter 53a of the aperture 53 at the bottom of the locking plate 51. The widening of the diameter increases the effective diameter of the aperture 53 during the engagement process. However, when the ball 24 attempts to egress the coupling member 45, as might occur during transport, the ball 24 is restrained from such movement by a constricted or smaller diameter 53b at the top of the plate 51. The constricted diameter 53b decreases the effective diameter during egression of the ball 24 from the female coupling member 45. The utility of the decreasing diameter or tapered aperture lies in the use of multiple effective diameters relative to a non-tapered aperture as described in U.S. Pat. No. 5,382,109.

The lock handle assembly 55 is attached to the inner tubular member 37, preferably by welding. The locking handle assembly 55 contains an outer housing 57, a spring 58 and a D-shaped handle 60. The D-shaped handle 60 slidably rests inside the housing 57 and may be moved manually upwardly or downwardly under the tension provided by the spring 58. The D-shaped lock handle 60 fits into a hole 45a bore in the female coupling member 45. Thus, the handle 60 locks the locking plate 51 into place directly below the stationary inner element 49.

As shown in FIG. 3, the inner tube assembly 30 also contains a plurality of height adjusting holes 62. These height adjusting holes 62 are preferably bore into one side of the square inner tubular member 37.

In the first embodiment, as shown in FIG. 4, the outer tube assembly 32 is comprised of a generally square outer tubular member 64 having a diameter slightly larger than the inner tubular member 37. Preferably, the outside diameter of the outer tubular member is about 4.5 inches. Preferably, the outer tube assembly 32 also includes a reinforcing band 66 attached to the outer surface of the outer tubular member 64 preferably by welding. The reinforcing band 66 adds considerable strength to the outer tubular member 64 so that it may withstand forces, or bending movements which may be applied to the coupling device 14 when in use.

Referring to FIG. 4, in the first embodiment an adjusting nut 68 is attached to the reinforcing band 66 preferably by welding. A hole (not shown) is bore through the band 66 and the outer tube member 64 where the nut 68 is attached to allow an adjusting bolt 69 to enter in to the adjusting nut 68 and pass through the adjusting band 66. The bolt 69 communicates with the nut 68 preferably by screwing the bolt into the nut. The bolt 69 acts in cooperation with the inner tube assembly preferably by providing a friction force against the inner tube assembly 30 to prevent the inner tube assembly 30 from moving relative to the outer tube assembly 32 and thus preventing the coupler's collapse.

The end of each adjusting bolt 69 may be further cupped to dig into the inner tubular member 37. The cupped end of the bolt 69 allows the bolt to dig into the member 37 when force is put on the bolt through tightening. This cupped end is comprised of a concave surface surrounded by an extending circular perimeter. It is extending perimeter which penetrates into the surface inner tubular member 37 so that it pinches member when the bolt 69 is tightened. The extended circular perimeter leaves a circular mark in the tubular member so that when it is loosened, it is possible to see it. Although there is slight damage to the surface of the tubular member 37, during normal use and operation there are usually only two or three circular marks because most operators rarely move their trailers from a certain preferred height.

In the first embodiment, as shown in FIG. 4, a plunger pin assembly 70 is attached to the reinforcing band 66, preferably by welding. Preferably, at the point where the plunger pin assembly 70 attaches to the reinforcing band 66, a hole 67 is bore through the reinforcing band 66 and the outer tubular member 32 as shown in FIG. 3. A plunger pin 72 slides into the plunger pin assembly 70 and through the hole 67 to fit into one of the height adjusting holes 62 in the inner tube assembly 30 to lock the coupler 22 at a desired height and thus levels the trailer 5 with the towing vehicle 10. Preferably, the plunger pin 72 is made out of steel bar stock and its diameter is slightly smaller than the adjusting hole 62 diameter to allow the plunger pin to move freely in and out of the holes 62.

The adjusting bolt 69 feature also helps prevent wearing, kinking, and bending of the pin 72 when all of the dynamic load of the trailer 5 is extended on the pin. Further, it prevents the trailer load from wearing the other components in the system.

In the first embodiment as best seen in FIG. 4, the plunger pin assembly 70 also contains a plunger pin housing 74 made of bent, steel plate stock. The plunger pin housing 74 contains a plunger pin spring 76 as shown in FIG. 3 to bias the plunger pin 72 within the housing 74. A cam slot 78 and a lock out aperture 80 are integrally formed in the surface of the plunger pin housing 74 as best shown in FIG. 4. The cam slot 78 and lock out aperture 80 allow this cam assisted plunger pin 72 to be turned and gradually slid out of a height adjusting hole 62 as shown in FIG. 5.

As best shown in FIG. 3, in the first embodiment a snapper pin 82 fits into an aperture contained in the plunger pin housing 74. This feature allows the operator to determine whether the plunger pin 72 is in the closed position (C) (FIG. 4) or the open position (O) (FIG. 5) and to ensure that the plunger pin 72 is properly engaged in one of the height adjusting holes 62 when in the closed position (C) (FIG. 4). The snapper pin 82 is connected to the plunger pin housing 74 by a snapper pin chain 84. The chain 84 prevents the snapper pin 82 from becoming misplaced when it is removed from the hole 62 as shown in FIG. 5.

Figure 6:
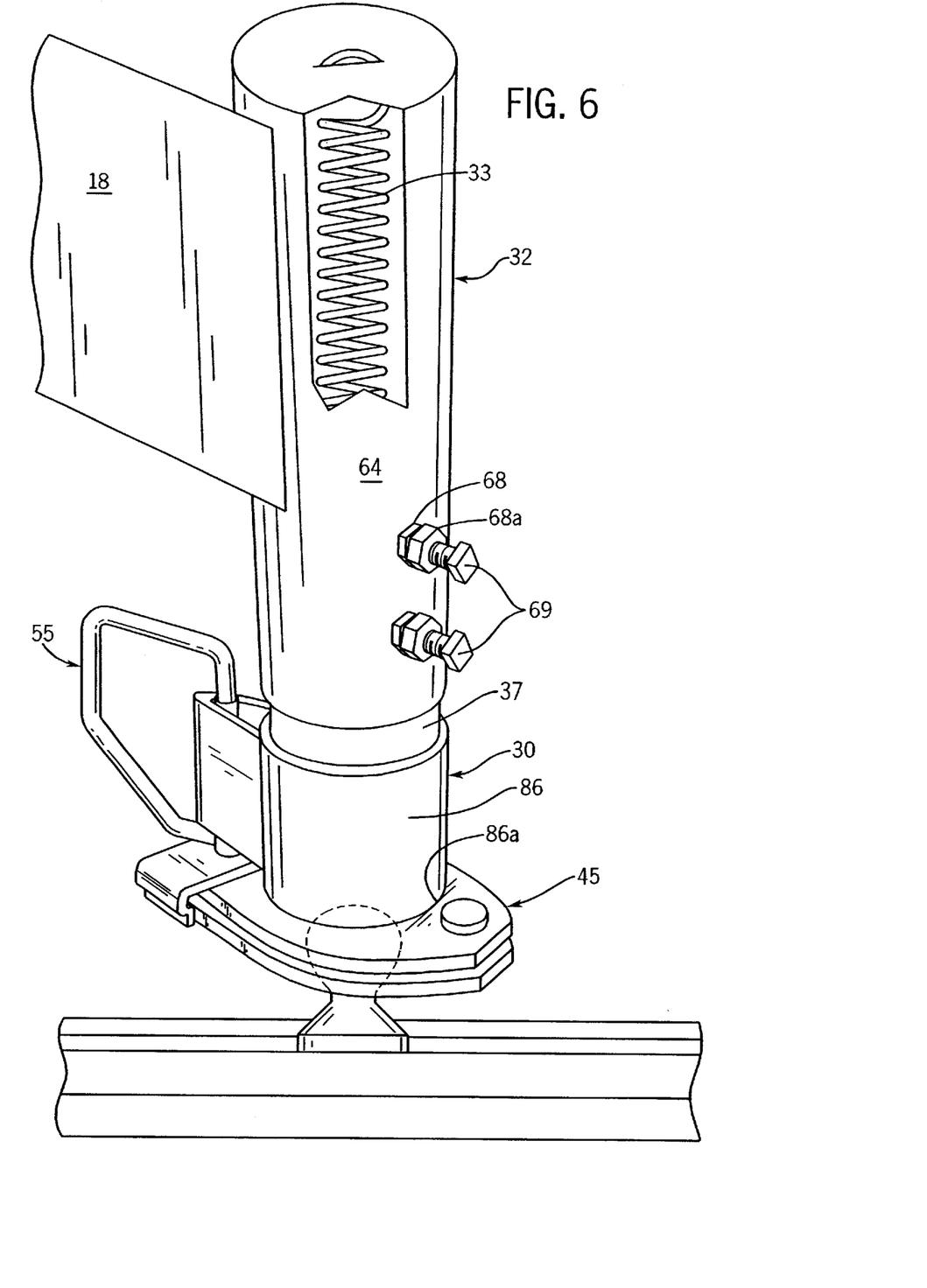
FIG. 6 is a perspective of another embodiment of the improved coupling device.
Figure 7:
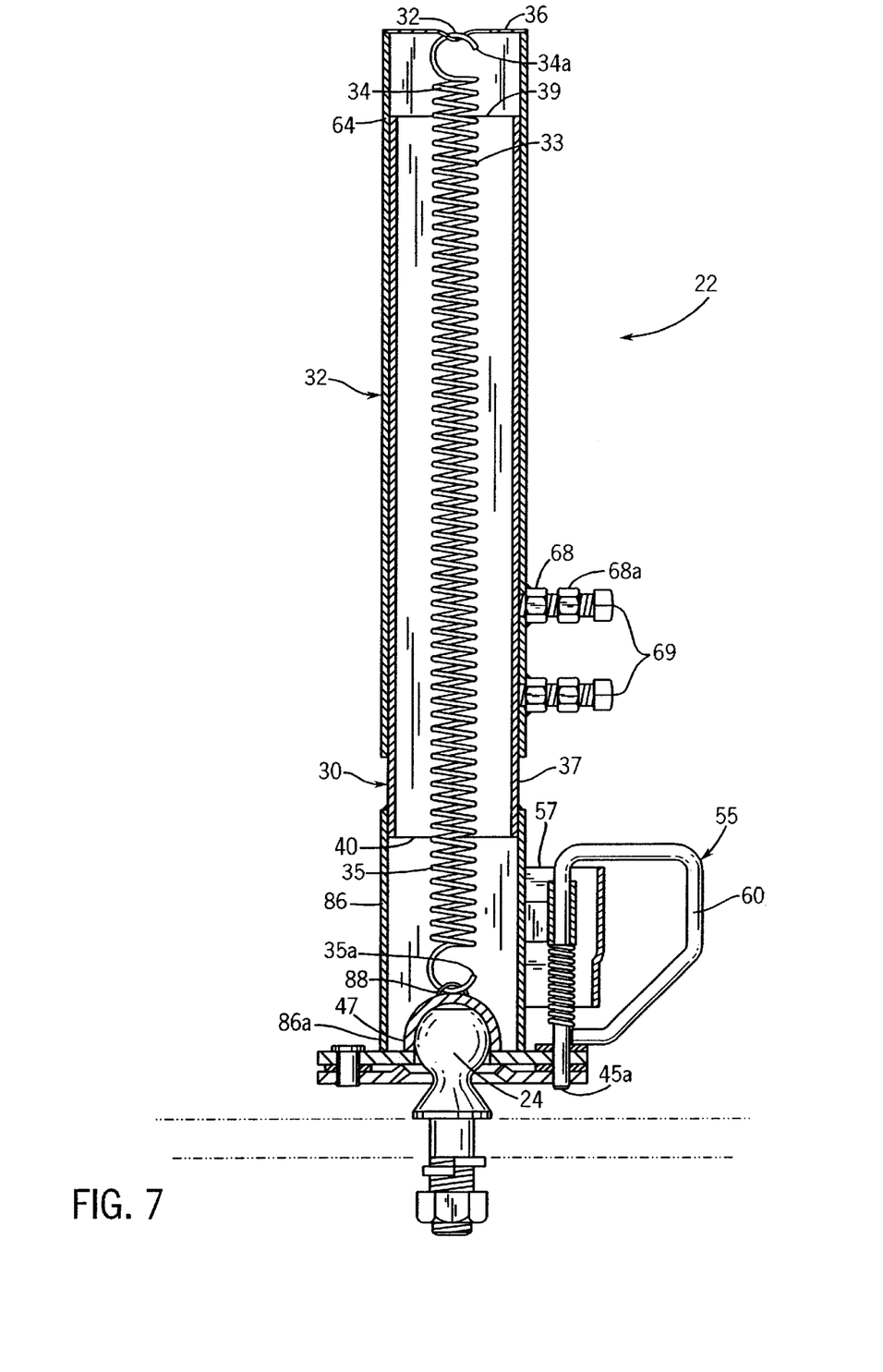
FIG. 7 is a fragmentary view of the improved coupling device of FIG. 6.

In the second embodiment, shown in FIGS. 6 and 7, the coupling device also has an outer tube assembly 32 and inner tube assembly 30. However, both the inner tubular member 37 and the outer tubular member 64 are generally round instead of generally square.

The generally round inner tubular member 37 of the second embodiment also has a top end 39 and a bottom end 40. Attached to the bottom end 40 of the inner tubular member 37 is a generally round base tube 86 which is also part of the inner tube assembly 30. Preferably, the inner tubular member 37 is constructed of round tube that has an outside diameter of 4 inches. The base tube 86 has a diameter larger than the inner tubular member 37. Preferably, the base tube 86 has the same diameter and same thickness as the outer tubular member 64.

The base tube 86 provides additional support for the coupler if the adjusting bolts 69 strip or there is no friction between the tubular members and the cupped end of the adjusting bolt. Because of the potentially high load on the coupler 22, if the base tube 86 was not present the outer tubular member 64 would slide down the length of the inner tubular member 37 and crash the trailer 5 and coupler 22 into the truck bed 16, damaging the trailer 5, the goose neck 15, the coupler 22 and most likely the truck bed 16. The larger diameter of the base tube 86 limits the length of the fall and thus prevents damaging the trailer 5, towing vehicle 10, and the coupler 22.

The base tube 86 has a female coupling member 45 attached at its bottom end 86a. In communication with the female coupling member 45 is a bent piece of metal or flange 88 to provide a connecting point for the return spring second end hook 35a. The flange 88 is preferably welded in place. The base tube 86 and the outer tubular member are preferably constructed of round tube with a 4.5 inch outside diameter.

In Use and Operation

During the uncoupling process, the operator first will raise the front end of the trailer 5 by cranking the jack(s) 20 so that all of the load is off the hitch ball 24 and on the trailer 5 as shown in FIG. 2. The locking handle assembly 55 is manually pulled upwardly toward to outer tube assembly 32 allowing the D-shaped handle 60 to disengage the female coupling member 45 as shown in FIG. 5. The locking plate 51 is then slid underneath the stationary inner element 49 opening the female coupling member 45 sufficiently to allow the hitch ball 24 free as shown in FIG. 5. The adjusting bolt 69 in communication with the adjusting nut 68 is then slowly unscrewed so that the bolt is no longer applying friction on the inner tube assembly 30 as shown in FIG. 5.

In the second embodiment, as shown in FIGS. 6 and 7, an additional adjusting nut 68 and bolt 69 are present for added safety. Further an Secondary nut 68a is also present which butts against the nut 68 to ensure that the bolt 69 does not accidentally loosen. In this embodiment, the additional adjusting bolt 69 and the secondary nut 68a must also be unscrewed to release the inner tube assembly 30.

Alternatively, the operator will ensure that the adjusting bolt 69 and nut 68 are first loosened. The locking handle assembly 55 D-shaped handle 60 is then raised to an unlocked position to allow the locking plate 51 to swivel, freely releasing the ball 24.

Finally, in the first embodiment as shown in FIG. 4 and 5, the snapper pin 82 is pulled from its hole in the plunger pin housing 74. The cam assisted plunger pin 72 is then moved from its closed position (C) to its open position (O) by turning the pin 72 toward the lock out aperture 80 in the plunger pin housing 74 along the cam slot 78 until the plunger pin 72 is released from one of the five adjusting holes 62 in the inner tube assembly 30.

Once the inner tube assembly 30 is freed from the outer tube assembly 32 the return spring 33 lifts the inner tube assembly 30 of the coupler 22 off the hitch ball 24 as shown in FIG. 5. When the coupler 22 is disengaged from the hitch ball 24, the towing vehicle 10 can then be driven out from underneath the trailer 5 and coupler 22.

During the coupling process, the operator will maneuver the towing vehicle 10 so the hitch ball 24 is aligned with the hole in the locking plate 51.

The coupler 22 is then lowered manually against the tension of the return spring 33 until the hitch ball 24 is fully inserted into the concave cavity 47 of the female coupling member 45.

Next, the locking plate 51 is swivelled to a closed position and the D-shaped locking handle 60 is engaged in a locked position as shown in FIG. 4.

In the first embodiment, the plunger pin 72 is then moved to the closed position (C). If the plunger pin 72 is not lined up with the proper height adjusting hole 62 and therefore fails to engage, the operator lowers the trailer with the jack(s) 20 until the pin 72 snaps into the proper hole 62. The snapper pin 82 is then installed.

Finally, the adjusting bolt(s) 69 and nut(s) 68 are tightened. The trailer jack(s) 20 are then raised to the towing position and the trailer 5 is ready to be towed by the towing vehicle 10.

The present invention has been described in terms of the preferred embodiments, and it is recognized that equivalents, alternatives, and modifications, aside from those expressly stated, are possible and within the scope of the appending claims.

I claim:

1. A coupling device for a trailer, the coupling device comprising:
    a trailer tongue mount for attachment to the trailer;
    a coupler attached to the trailer tongue mount, the coupler including an outer tube assembly, wherein the outer tube assembly comprises:
        a square outer tubular member,
        a reinforcing band attached to the outer tubular member;
        an adjusting nut attached to the reinforcing band; and
        an adjusting bolt in communication with the nut to provide a friction force on the inner tube assembly;
    an inner tube assembly slidably received by the outer tube assembly; and
    a return spring having a first end attached to the outer tube assembly and a second end attached to the inner tube assembly for drawing the inner tube assembly upwardly toward the first end of the return spring.

2. The coupling device of claim 1, wherein the inner tube assembly comprises:
    a generally square inner tubular member having a plurality of height adjusting holes, a top end, and a bottom end; and
    a female coupling member attached to the bottom end of the square tubular member.

3. The coupling device of claim 2, wherein the female coupling member comprises a concave cavity defined by a stationary inner element and a pivotally supported, apertured, plate-like outer element.

4. The coupling device of claim 2, further comprising a plunger pin for engaging one of the adjusting holes in the inner tube assembly.

5. The coupling device of claim 2, wherein the inner tube assembly further comprises a locking handle assembly operably associated with the inner tubular member.

6. The coupling device of claim 2 wherein the return spring is attached to a flange in communication with a female coupling member.

7. The coupling device of claim 1, wherein the inner tube assembly comprises a generally round inner tubular member having a top end and a bottom end.

8. The coupling device of claim 1, further comprising a trailer jack for supporting the trailer; and wherein the coupler is capable of engaging a male coupling member, the male coupling member for coupling with the female coupling member.

9. The coupling device of claim 1, further comprising a plunger pin assembly attached to the reinforcing band.

10. The coupling device of claim 9, wherein the plunger pin assembly comprises a snapper pin to indicate that the plunger pin is properly closed and engaged in one of the adjusting holes in the inner tube assembly.

11. A coupler for securing a trailer to a vehicle having a hitch ball, the coupler comprising:
    an outer tube assembly adapted for attachment to the trailer;
    an inner tube assembly having an upper portion and a lower portion;
    the upper portion of the inner tube assembly slidably received by the outer tube assembly;
    a female coupling member having a cavity for receiving the hitch ball attached to the lower portion of the inner tube assembly;
    a locking handle assembly attached to the inner tube assembly for locking the female coupling member to the hitch ball;
    a return spring connected to the inner tube assembly and the outer tube assembly;
    an adjusting nut affixed to the outer tube assembly;
    an adjusting bolt engaged by the adjusting nut; and
    a plunger pin engaged in at least one of five adjusting holes in the inner tube assembly to lock the coupler at a desired height.

12. The coupler of claim 11, further comprising a locking plate for locking the coupler into place with respect to the vehicle.

13. The coupler of claim 11, further comprising:
    a trailer tongue mount adapted for attachment to the trailer and the coupler; and
    a jack adapted for attachment to the trailer.

14. The coupler of claim 11, further comprising a cam assisted plunger pin assembly attached to the outer tube assembly.

15. The coupler of claim 11, wherein the return spring is an extension spring.

16. A coupler for securing a trailer to a vehicle having a hitch ball, the coupler comprising:
    an outer tube assembly adapted for attachment to the trailer;
    an inner tube assembly having an upper portion and a lower portion;
    the upper portion of the inner tube assembly slidably received by the outer tube assembly;
    a female coupling member having a cavity for receiving the hitch ball attached to the lower portion of the inner tube assembly;
    a locking handle assembly attached to the inner tube assembly for locking the female coupling member to the hitch ball;
    a return spring connected to the inner tube assembly and the outer tube assembly;
    a cam assisted plunger pin assembly attached to the outer tube assembly; and
    a snapper pin to indicate that the plunger pin is properly closed and engaged in an adjusting hole in the inner tube assembly.

17. The coupler of claim 16, further comprising an adjusting bolt which can be tightened to provide a friction fit between the two tubular members.

18. The coupler of claim 17, wherein the cam assisted plunger pin assembly includes:
    a plunger pin;
    a plunger pin housing attached to the outer tube assembly, the plunger pin housing comprising a cam slot, integral with housing, a lock out aperture adjacent the cam slot, and a connecting chain for connecting the snapper pin to the housing; and
    a spring to bias the plunger pin within the housing.

19. A coupler for securing a trailer to a vehicle having a hitch ball, the coupler comprising an outer tube assembly adapted for attachment to the trailer;

an inner tube assembly having an upper portion and a lower portion;

the upper portion of the inner tube assembly slidably received by the outer tube assembly;

a female coupling member having a cavity for receiving the hitch ball attached to the lower portion of the inner tube assembly;

a locking handle assembly attached to the inner tube assembly for locking the female coupling member to the hitch ball;

a return spring connected to the inner tube assembly and the outer tube assembly;

a cam assisted plunger pin assembly attached to the outer tube assembly; and a snapper pin, and a connecting chain connected to the snapper pin.

20. A coupling device for a trailer, the coupling device comprising:

a trailer tongue mount for attachment to the trailer;

a coupler attached to the trailer tongue mount, the coupler including an outer tube assembly;

an inner tube assembly slidably received by the outer tube assembly; and a return spring having a first end attached to the outer tube assembly and a second end attached to the inner tube assembly for drawing the inner tube assembly upwardly toward the first end of the return spring;

wherein the inner tube assembly comprises a generally round inner tubular member having a top end and a bottom end and wherein the inner tube assembly further comprises a generally round base tube attached to the inner tubular member and having a diameter larger than the inner tubular member to prevent collapse of the coupler.

21. A coupling device for mounted to a tailer, the coupling device comprising:

a trailer tongue mount for attachment to the trailer;

a coupler attached to the trailer tongue mount, the coupler including an outer tube assembly;

an inner tube assembly slidably received by the outer tube assembly;

a return spring having a first end attached to the outer tube assembly and a second end attached to the inner tube assembly for drawing the inner tube assembly upwardly toward the first end of the return spring;

a first adjustment bolt; and a second adjustment bolt acting in cooperation with the inner tube assembly to prevent collapse of the coupling device.

22. A coupler for securing a trailer to a vehicle having a hitch ball, the coupler comprising:

an outer tube assembly adapted for attachment to the trailer;

an inner tube assembly having an upper portion and a lower portion;

the upper portion of the inner tube assembly slidably received by the outer tube assembly;

a female coupling member having a cavity for receiving the hitch ball attached to the lower portion of the inner tube assembly;

a locking handle assembly attached to the inner tube assembly for locking the female coupling member to the hitch ball;

a return spring connected to the inner tube assembly and the outer tube assembly;

an adjusting nut affixed to the outer tube assembly;

an adjusting bolt engaged by the adjusting nut; and a plunger pin engaged in at least one adjusting hole in the inner tube assembly to lock the coupler at a desired height.

* * * * *